E. G. STAUDE.
VARIABLE GEARING.
APPLICATION FILED MAR. 10, 1910.
1,180,952.
Patented Apr. 25, 1916.
2 SHEETS—SHEET 2.
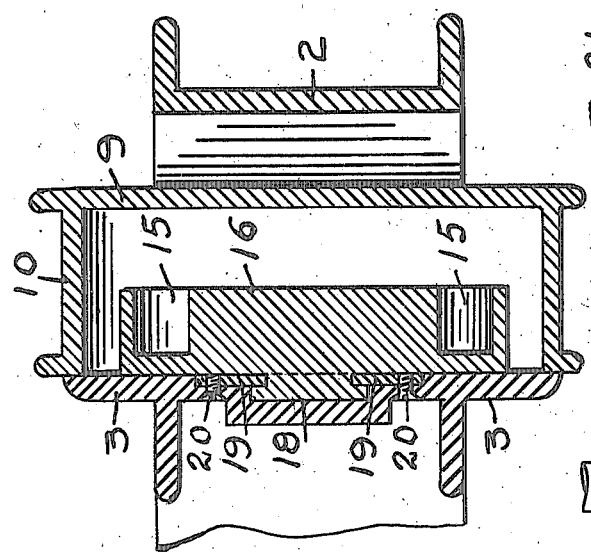
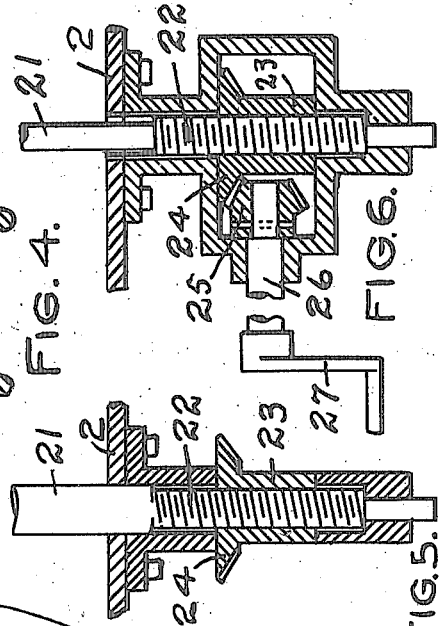
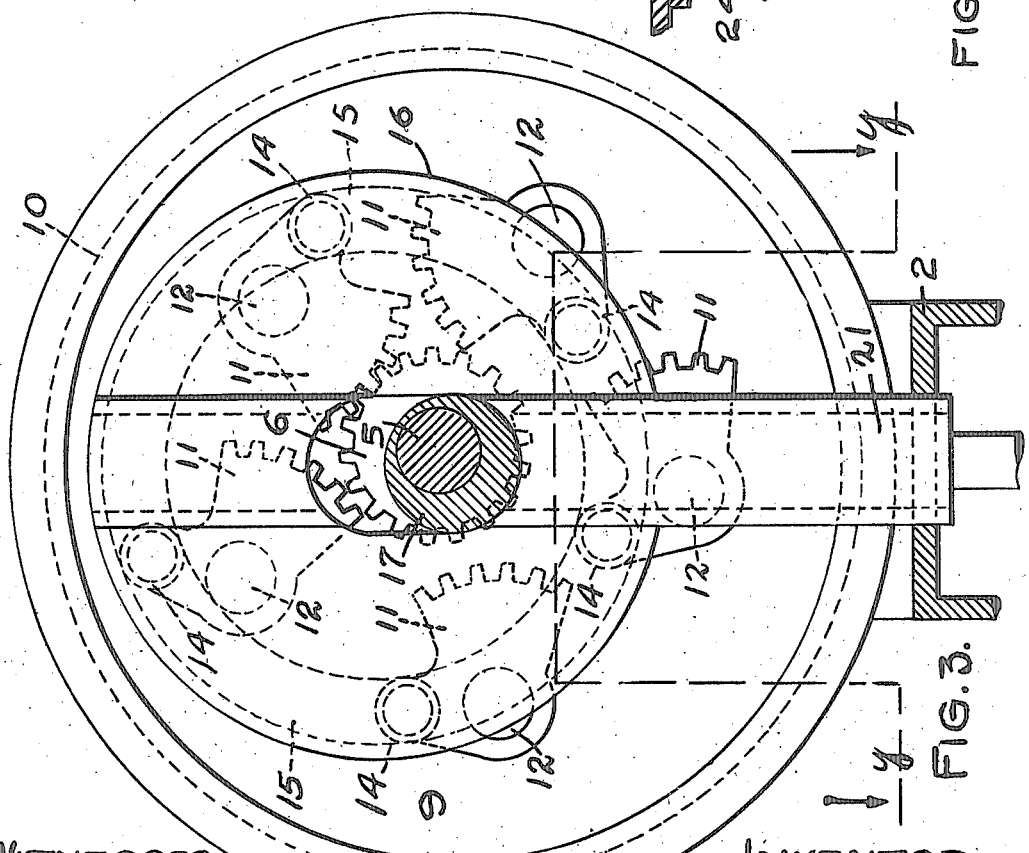
WITNESSES
INVENTOR
EDWIN G. STAUDE
BY Paul & Paul
HIS ATTORNEYS

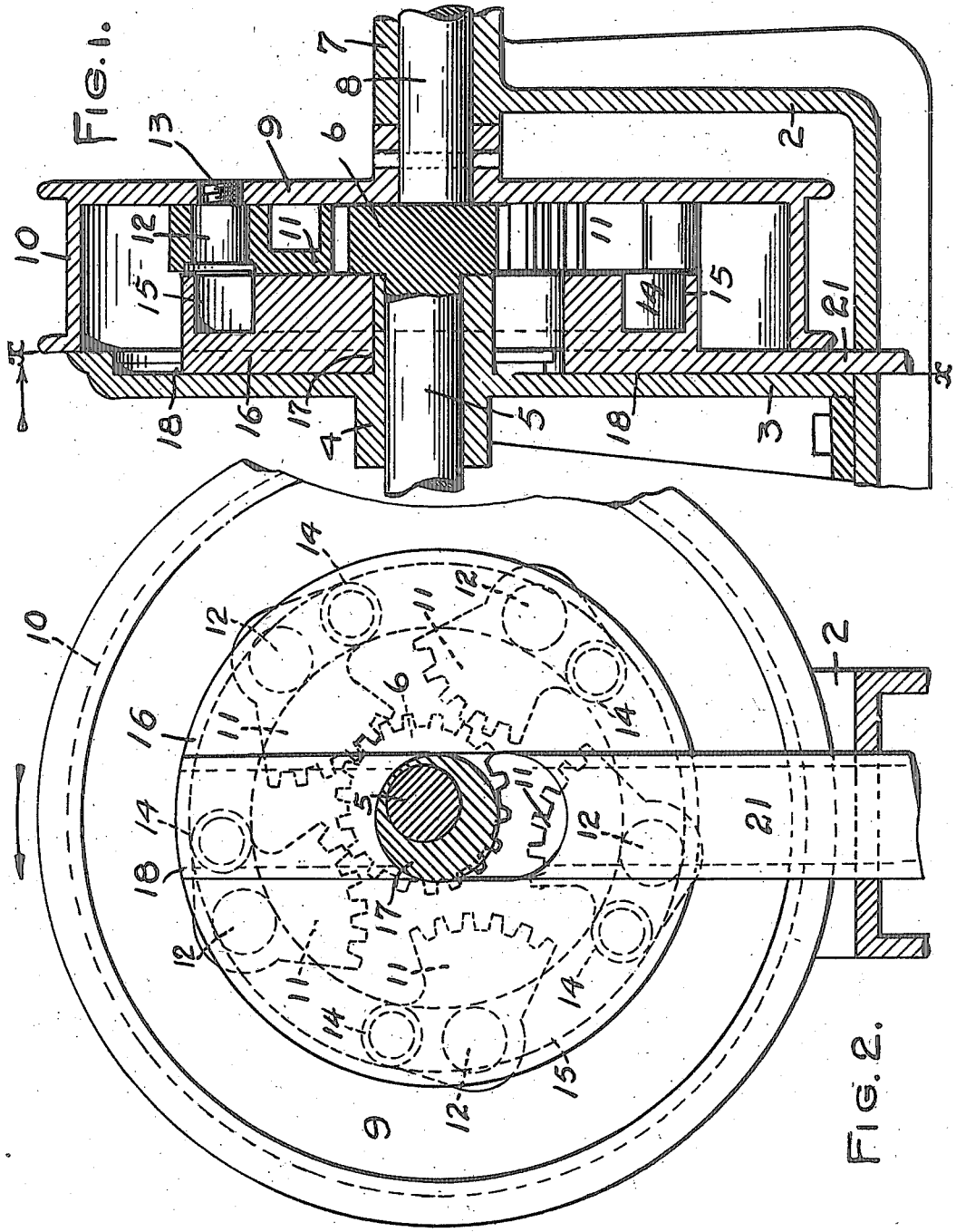

UNITED STATES PATENT OFFICE.

EDWIN GUSTAVE STAUDE, OF MINNEAPOLIS, MINNESOTA, ASSIGNOR TO E. G. STAUDE MANUFACTURING CO., OF MINNEAPOLIS, MINNESOTA, A CORPORATION.

VARIABLE GEARING.

1,180,952.  Specification of Letters Patent.  Patented Apr. 25, 1916.

Application filed March 10, 1910. Serial No. 548,501.

*To all whom it may concern:*

Be it known that I, EDWIN G. STAUDE, of Minneapolis, Hennepin county, Minnesota, have invented certain new and useful Improvements in Variable Gearing, of which the following is a specification.

The object of my invention is to provide a mechanism which shall be positively gear driven and still permit the driving and driven shafts to run at variable speeds.

A further object is to provide a device which shall be exceedingly simple in construction.

A further object is to provide an arrangement permitting large and substantial bearings to all moving parts.

A further object is to provide a construction which will automatically and immediately stop the driven shaft when through either an accident or otherwise the controlling means shall have become broken.

The invention consists generally in various constructions and combinations, all as hereinafter described and particularly pointed out in the claims.

In the accompanying drawings, forming part of this specification, Figure 1 is a cross section of the variable speed gearing, Fig. 2 is a view substantially on the line x—x, of Fig. 1, looking in the direction of the arrow, Fig. 3 is a similar view showing the speed controlling cam in its extreme eccentric or "stop" position, Fig. 4 is a section on the line y—y of Fig. 3, Figs. 5 and 6 are details showing a method of operating the speed controlling cam.

In the drawing, 2 represents a suitable base whereon is mounted the standard 3 having a bearing 4 in which rotates the driven shaft 5 and at the end of which is the driven pinion 6. At the upper end of the base 2 I provide a bearing 7 to support the driving shaft 8. Mounted on the inner end of this driving shaft is a disk 9 having a flange 10 adapted to perform the function of a pulley and at the same time inclose the gearing within. It is, of course, obvious that the disk 9 may either be driven through the shaft 8 or by a belt on the flange 10. Mounted within the case formed by the disk 9 and the flange 10 are a series of gear sectors which I indicate by reference figure 11. These gear sectors are pivoted on studs 12, which are secured to the disk 9 at points 13. The sector gears are all pivoted in a circle which is concentric to the shaft 8 but eccentric to the shaft 5. For the purpose of controlling the sector gears I mount rollers 14 thereon. These rollers are adapted to travel in a groove 15 of the speed controlling disk 16. This disk 16 is mounted on a bearing 17 which is concentric to the driving shaft 8 and eccentric to the driven shaft 5. For convenience, this bearing is formed integral with the standard 3. The speed controlling disk has a further bearing 18 above and below the bearing 17 and is held in place by plates 19 fastened by suitable screws 20. The speed controlling disk 16 has a depending arm 21 at the lower end of which is the threaded portion 22 having a nut 23 which operates an integral gear 24. A pinion 25 with a shaft 26 and a crank 27 form means for adjusting the speed controlling disk.

I have shown in the drawings the shaft 8 eccentric to the shaft 5, preferably in a direction of 45 degrees to a line drawn parallel with the movement of the controlling disk. The purpose of this is that as the sector gears mounted on the disk 9 revolve about the center of the shaft 8, they will come in contact with the gear or driven pinion 6 during only a part of their revolution.

It is obvious that any one skilled in the art could easily provide a construction whereby both the driven and the driving shaft would be concentric, but, through a mechanical means move the studs 12 toward and away from the gear 6 at predetermined intervals, and in that way accomplish the same result, as herein shown. In controlling the movement of the sector gears 11, through the medium of the roller 14 operating in the groove 15, I find that it is essential that the roller 14 be placed in a position so that when the speed controlling disk is in a position concentric to the shaft 8, the rollers 14 will then travel on the line described by the center of the stud 12. The distance that the roller 14 should be from the center of the stud 12 is a certain relative proportion of the diameter of the speed controlling disk. In order to produce a continuous and uniform movement of the driven gear 6 it is necessary that the face of the sector pinions 11 travel at a continuous and uniform speed while they are in mesh with the gear 6, and to accomplish this result the roller 14, as above stated, travels on a line which is described by the stud forming the pivot for the sector gear 11 only when the speed controlling cam is placed in a concentric position to the shaft 8. In this position the sector gears will revolve with the disk 9 but will not have any movement within themselves, for the reason that the roller 14 travels in a circle concentric with the pivot of the disk 9. Immediately upon forcing up the speed controlling disk 16, however slight, it will throw the roller 14 out of the path described by the stud 16 and will in effect make an eccentric out of the speed controlling disk. As the throw of the eccentric is greatest at a point at right angles to a line drawn through the lowest and highest point, it would follow that the roller 14 would have a motion which would not be continuous and uniform and to obviate this I find that by placing the roller 14 in the position above described with relation to the stud 12, I create in effect a condition opposite that of the action of the controlling disk. In other words, when the controlling disk is at the limit of its movement the position of the roller 14 on the sector gear is such that it will be at the point of least movement; also when the speed of the controlling disk is at the point of its least movement, the face of the sector gear will be at the extreme limit of its movement. I am able, therefore, to get a constant, uniform surface speed on the sector gear 11 and the velocity of this speed will depend entirely on the position of the controlling disk 16 but, whatever its position, the face of the sector gears during the time that they are going into mesh and until they are completely out of mesh again, will have a constant, uniform speed. By placing the speed controlling disk in the position shown in Fig. 3, the sector gear 11 is placed in its upward position just before entering into mesh with the gear 6, and the path of the groove 15 is such that the roller will be permitted to travel outward and away from the center of the disk 9 at such a speed which will permit the sector gear 11 to revolve on its axis at suitable speed to allow the gear 6 to remain stationary. Should, however, the speed controlling disk be moved toward the center of the disk 9, the roller 14 will not have the required movement to permit the gear 6 to remain stationary, but will advance the gear 6 the difference between the movement that the roller 14 is retarded over that of the previous position of the speed controlling disk.

I have shown five sector gears mounted on the disk 9, but, it is obvious that where heavy duty is required I can offset the sector gears in such a manner that I would have room for 8 or 10 on the disk 9, or I might use two disks and secure them upon a shaft at a point so that the center of the sectors on one disk will come between the centers of the sectors on the other disk. I have shown the sector gears operating on a pinion having teeth on its external surface, but I do not confine myself to this arrangement, as they will perform their functions equally well if I use an internal gear and provide teeth on opposite sides of the sector gears as long as I keep the surface speed of the sector gears constant during the time that they are in mesh with the driven gear.

I claim as my invention:

1. The combination, with a driving shaft, of a disk secured thereon, gear sectors pivoted on said disk, a driven shaft and a pinion thereon adapted to mesh with said gear sectors, a speed controlling disk concentric with said driving shaft and eccentric with respect to said driven shaft and operatively connected with said sectors to oscillate the same on their pivots, for the purpose specified.

2. The combination, with a driving shaft, of a disk secured thereon, gear sectors pivoted on said disk around said shaft, a driven shaft and a pinion thereon adapted to mesh with said gear sectors, a speed controlling disk mounted concentrically with respect to said driving shaft and eccentrically with respect to said driven shaft, said speed controlling disk having an annular groove in its face, and said sectors having anti-friction rollers and bearings therefor fitting within said groove, for the purpose specified.

3. The combination, with a driving shaft, of a disk secured thereon, gear sectors pivoted on said disk, a driven shaft and a pinion thereon adapted to mesh with said gear sectors, a speed controlling disk eccentrically mounted with respect to said driven shaft, said speed controlling disk having operative connections with said gear sectors, and means for adjusting said speed controlling disk to vary its degree of eccentricity with respect to said driven shaft.

4. The combination, with a driving shaft and a disk secured thereon, of a series of gear sectors pivoted at intervals on said disk around said shaft, a driven shaft a pinion thereon adapted to mesh with said gear sectors, a speed controlling disk eccentrically mounted with respect to said driven shaft and having an annular groove anti-friction rollers mounted on said gear sectors, said speed controlling disk being capable of a vertical movement in its bearing to change its degree of eccentricity with respect to said driven shaft, for the purpose specified.

5. The combination, with a driving shaft, and a disk secured thereon, of a series of gear sectors pivoted at intervals on said disk around said shaft, a driven shaft a pinion thereon adapted to mesh with said gear sectors, a speed controlling disk eccentrically mounted with respect to said driven shaft and connected with said gear sectors to oscillate the same, and means for shifting said speed controlling disk to change its degree of eccentricity with respect to said driven shaft, for the purpose specified.

6. The combination, with a driving shaft, of a series of gear sectors pivotally connected with said shaft and driven thereby, a driven shaft and a pinion thereon adapted to mesh with said gear sectors, a speed controlling means concentric with said driving shaft and eccentrically mounted with respect to said driven shaft, said speed controlling means being operatively connected with said sectors to oscillate the same, substantially as described.

7. The combination, with a driving shaft, of a disk secured thereon, gears pivoted on said disk, a driven shaft and a pinion thereon adapted to mesh with said gears, a speed controlling means concentrically mounted with respect to said driving shaft and eccentrically mounted with respect to said driven shaft and operatively connected with said gears, for the purpose specified.

8. The combination, with a driving shaft and a disk secured thereon, of a series of gear sectors pivotally mounted on said disk, a driven shaft and a pinion thereon, said gear sectors being adapted to mesh at intervals with said pinion and arranged in a circle on said disk concentric with said driving shaft and eccentric with respect to said driven shaft, a speed controlling disk eccentrically mounted on said driven shaft and concentrically arranged with respect to said driving shaft, said speed controlling disk having an annular groove therein and said gear sectors having anti-friction rollers fitting within said groove, and means for shifting said speed controlling disk to change its degree of eccentricity with respect to said driven shaft.

9. The combination, with a driving shaft, of pivoted gear sectors mounted to revolve therewith, a driven shaft having a pinion to mesh with said sectors, a speed controlling means operatively connected with said gears, and means for shifting the position of said speed controlling means.

10. The combination, with a driving shaft, of gears mounted to revolve therewith, a driven shaft having a pinion to mesh with said gears, said gears being concentric with respect to said driving shaft and eccentric with respect to said driven shaft, and a speed controlling means operatively connected with said gears.

11. The combination, with a driving shaft, of pivoted gears mounted to revolve therewith, a driven shaft having a driving connection with said gears, a speed controlling means operatively connected with said gears, and means for shifting said speed controlling means.

In witness whereof I have hereunto set my hand this 7 day of March 1910.

EDWIN GUSTAVE STAUDE.

Witnesses:
J. A. BYRNES,
L. C. CRONEN.